June 6, 1939.   B. H. KAPLAN   2,161,357
HEDGE AND LAWN CLIPPER
Filed Aug. 25, 1936
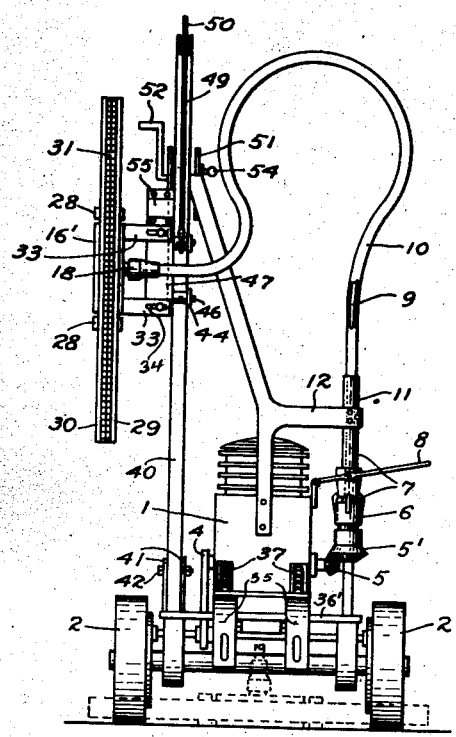
INVENTOR.
BERNARD H. KAPLAN
BY Miller Boyken & Bried
ATTORNEY.

Patented June 6, 1939

2,161,357

UNITED STATES PATENT OFFICE 2,161,357

HEDGE AND LAWN CLIPPER

Bernard H. Kaplan, Fairfax, Calif.

Application August 25, 1936, Serial No. 97,779

4 Claims. (Cl. 56—237)

This invention relates to lawn and hedge clippers and has for its objects improvements in such apparatus in which double elongated reciprocating blades are used so as to effectively trim or clip the heavy twigs of a hedge or to mow grass or the like, and a mounting and means of operating the blades on a power lawn mower whereby the blades may be disposed to extend vertically or horizontally in vertical or horizontal planes and may be raised or lowered to various heights, all while maintaining a positive driving connection with the driving motor of the mower through a conventional clutch adapted to disconnect the power connection to the blades, as desired. Other objects and advantages will appear in the following description and accompanying drawing.

Fig. 1 is a front view of the apparatus comprising my invention with the blades shown in full line and disposed in a vertical plane and extending vertically for trimming the side of a hedge and the blades are also indicated in dotted line to show their position when in lawn mowing position.

Fig. 2 is a fragmentary view showing the blades disposed in a horizontal plane and extending horizontally in an elevated position from the mounting at one side of the mower for trimming the top of a hedge.

Fig. 3 is a fragmentary sectional view of the blades in lawn mowing position and also showing the mounting of the blades on the carriage or mower, when in this position.

Fig. 4 is a fragmentary elevational view of the mounting of the blades for raising or lowering the same for trimming hedges of various heights.

Fig. 5 is an enlarged sectional view showing the connection between the flexible driving shaft and blades.

Fig. 6 is a view, partly in section, showing the means for reciprocating the blades.

In detail, I provide an engine or motor 1 supported by ground wheels 2 for rolling on the ground, the engine being connected, as by a sprocket chain 4 to the wheels for driving the latter through conventional gears and sprockets. A power driven shaft projecting from a side of the engine drives bevel gears 5, 5' the latter driving a shaft extending upwardly therefrom on which is the socket element 6 of a cone clutch and rigid shaft 7 extends upwardly from the cone element of the clutch, which cone is moved to and from driving engagement in the socket element by a conventional lever 8 retained between spaced collars on shaft 7. Shaft 7 connects at its upper end with one end of a flexible cable shaft 9 rotatable in a flexible hose sheath 10, which sheath is rigidly held by a clamp 11 on arm 12 against rotation with the shaft 9, arm 12 being bolted to the frame or to the engine as shown.

The opposite end of flexible shaft 9 is provided with a rigid elongated extension member 13 (see Fig. 5) which is square in cross section and which member slidably extends into a complementarily formed recess in one end of a shaft 14, the opposite end of shaft 14 being formed with a pair of oppositely offset cranks 15, 15'.

Shaft 14 extends outwardly of a top plate 16 of an oblong housing through a bearing hub 17 formed on said top plate. A rigid sleeve 18 fits over the hub at one end and is secured thereto by a set screw 19, and the end of the hose sheath 10 extends into the opposite end of the sleeve 18 and is secured thereto by a bolt 19'.

The cranks 15, 15' are disposed within the housing of which 16 is the top, 20, 20' opposite sides, and 16' the bottom, the opposite ends being open and the housing being of elongated rectangular shape.

Within the aforesaid housing are upper and lower elongated plates 22, 23, slidably fitting within the housing, and projecting at their opposite ends out of the open ends of the housing. The flat sides of said plates are together and each plate is formed intermediate its ends with a transversely extending slot 24 each slot being fitted with a separate sliding block 25 and the blocks respectively rotatably fitting the cranks 15, 15' respectively. The adjacent sides of plates 22, 23 are recessed adjacent the cranks to accommodate the web 26 connecting the cranks as at 25'.

The opposite projecting ends of plate 22 are provided with arms 27 projecting therefrom and to one side of the housing, while lower plate 23 is provided with similar arms 28, the outer ends of arms 27 being bolted to an upper elongated blade 29, and the outer ends of arms 28 being bolted to a lower elongated blade 30, which blades are disposed with their flat adjacent sides in sliding engagement and are respectively formed with teeth 31 along adjacent edges whereby upon longitudinal movement of the blades relatively, grass or twigs entering between the teeth will be cut, in the same manner as in conventional mowing machine blades and substantially as shown in my previous Patent No. 2,051,862 dated August 25, 1936.

It will be seen from the foregoing that upon actuation of the motor of the mower, the blades will be longitudinally reciprocated relatively through the flexible shaft and grass, twigs, or sprouts entering between the teeth will be cut. Also, due to the flexible shaft connecting between the blades and engine, said blades will function to cut material in a plurality of positions without disconnecting the shaft connection.

Secured to the housing enclosing plates 22, 23 are a pair of bracket arms 33 projecting upwardly from one side of the housing, which arms are vertically slotted at 34 for passing bolts for securing the housing and blades to the mower in the desired positions.

For supporting the blades and housing in position for cutting grass, a pair of flat horizontally spaced metal arms 35 are revolvably supported on a short horizontal bar 36 secured to the frame 36' of the mower at its front end (see Figs. 1 and 3) said arms being turned downwardly at their forward ends for bolting the bracket arms 33 thereto in which position the blades will extend across the front of the mower and will project outwardly of opposite outer sides of the wheels 2 insuring a clean cutting of a much wider swath than heretofore in lawn mowers, and at the same time eliminating the objection of flattening the grass by the wheels prior to cutting. Coil springs 37 yieldably support the blades at the desired elevation, and permit the blades to automatically accommodate themselves to inequalities in the surface elevation of the lawn. The slots in bracket arms 33 also permit a preliminary adjustment of the blades to the desired elevation. The rear ends of one of the arms 35 extends rearwardly at 38 to a point accessible to the operator whereby the operator by pressing down on end 38 may raise the cutting blades and the blades may be maintained in such elevated position by hooking a hook 39 pivotally connected to the wheel axle over the depressed end of the arms 35 as indicated in dotted line in Fig. 3. Thus the mower can be manouvered over a lawn without the blades being in cutting position.

Fig. 1, in full line, shows the cutting blades in position for cutting the sides of a hedge. Supporting the blades in this position is a vertical post 40 removably secured at its lower end to the frame 36' of the mower adjacent one side of the frame. The post is made up of a pair of channel iron strips welded or secured together, back to back, thereby providing outwardly opening channels on opposite sides. The engaging bottom walls of the channel strips at the lower end of the post are vertically slipped between upwardly projecting spaced parallel members 41 that lie in the opposite channels, thus supporting the post upright, and if desired the members may be further secured in position by passing bolts 42 through said members and post, but this is not always necessary. Members 41 are welded or bolted to frame 36'.

Within each of the channels is slidably fitted a vertically elongated block 43. A pair of straps 44 are bolted at 45 at one end to the block adjacent the engine, and the other end of each strap projects to one side of the post where bolts 46 extend transversely through the straps to engage a bracket member 47 in the form of an angle iron, one leg of which is bolted to a sliding block in the opposite channel, said bolts 46 having spacers thereon to prevent binding on the post and canting of the blocks when tightened. The other leg of the angle iron bracket, see Figs. 1 and 4, is provided with bolts for securing to the bracket arms 33 that are connected to the housing and elements mounting the blades in vertical position at one side of the mower as seen in Fig. 1. From the upper bolt 46, a cable 49 extends upwardly over a pulley 50 at the top of the post and down the opposite side to a small winding drum 51 that is secured to a side of the post. The winding drum has a handle 52 for winding the cable and thereby elevating the blades by drawing the sliding blocks 43 upwardly in the post channels, and the drum is formed with an annular row of openings 53 through one end for passing a bolt 54 through an opening in the drum supporting bracket and one of openings 53 for holding the drum in any position of rotation. The operator is thus enabled to raise and lower the blades at will, by removing the bolt 54 and then inserting the bolt again to hold the blades at the desired elevation. A ratchet or any other suitable locking means for the drum may obviously be substituted for bolt 54 and openings 53.

To support the blades horizontal for trimming the top of the hedge, I provide the angle iron bracket 47 with a horizontally extending opening at its upper end (Fig. 2) by bolting a small channel strip 55 to a side of the bracket 47, and an elongated arm 56 is slidably passed through the opening thus provided, which arm has suitable bolts 57 at its outer end for bolting the arms 33 of the housing thereto, a set screw 58 at the strip 55 being provided for clamping the arm 56 at any desired degree of extension from the side of the mower. By manipulating the cable 49 the now horizontally extending blades may be elevated or lowered to the desired height.

It will be seen that in all three of the positions above described the flexible shaft 9 is at all times operatively connected to the blades and the only adjustment necessary for changing the positions of the blades from lawn mowing position to hedge trimming position is to remove the bolts connecting arms 33 to the arms 35 (Fig. 3). Several sets of blades may, of course, be operated from the motor without invention. The hose sheath over the flexible shaft 9 not only protects the shaft, but tends to assist in supporting the shaft.

It is of material importance to note that the driving connection between the shaft and blades is disposed at a point substantially intermediate the opposite ends of the blades, thereby transmitting the power uniformly to the blades, and also the means for reciprocating the blades is continuously revolving in one direction.

Having described my invention, I claim:

1. In apparatus of the character described, a frame having ground wheels, a pair of parallel, horizontally extending, elongated toothed cutting blades slidably mounted one on the other with their flat sides together for longitudinal reciprocation relatively, a rotatable drive shaft and a pair of cranks on said shaft offset relatively at opposite sides of the axis of rotation of the shaft, a bearing rigidly secured to each blade rotatably receiving one of said cranks whereby the blades will be reciprocated oppositely by the cranks upon rotation of said shaft power means on said frame for rotating said shaft, supporting means mounting said blades on said frame in a position substantially parallel with the ground, the bearings on the blades being disposed at a point to one side of and substantially centrally between the ends of the blades.

2. In a construction as defined in claim 1, the supporting means comprising an arm and a horizontal pivot connecting the arm with the frame for swinging the arm in a vertical plane about the pivot and means securing the blades to the arm at a point spaced from the pivot whereby the blades will be raised or lowered relative to the ground upon swinging the arm on said pivot.

3. In apparatus of the character described, a frame having ground wheels for rolling over the ground, an arm projecting outwardly of the frame at one end and a horizontal pivot connecting said arm to the frame at a point spaced from said end for swinging said end in a vertical plane about said pivot, a pair of horizontally disposed, elongated, toothed cutting blades positioned in sliding engagement with their flat sides together, means for reciprocating said blades longitudinally of the blades relative to each other, means for securing said blades in said position, means securing said blades to the outwardly projecting end of said arm against tilting relative to horizontal while permitting the blades to swing in said vertical plane together with said outwardly projecting end of said arm upon swinging said end, and releasable locking means supporting the outer end of the arm and blades in elevated position relative to the ground upon the outer end of the arm and the blades being swung from a lowered position to the elevated position, the means for reciprocating the blades comprising a flexible driving connection operatively connecting between the drive shaft of a motor and said blades at all times during movement of the blades in said vertical plane.

4. In apparatus as described, a portable frame carrying a pair of elongated, toothed cutting blades slidably engaging each other with their flat sides together for longitudinal reciprocation relatively, a pair of arms rigidly connected to each of the blades, said arms projecting laterally from the blades to one side and a pair of superposed plates connected respectively to said arms, means supporting said plates for reciprocation relatively in the direction of the length of the blades, means for reciprocating said plates relatively comprising a pair of cranks offset relative to each other, a bearing block rotatably receiving each crank slidably connected with each of said plates and means for revolving said crank.

BERNARD H. KAPLAN.